Aug. 22, 1967  J. G. FONTAINE  3,336,687
CHANGEABLE EXHIBITOR

Filed July 8, 1965  5 Sheets-Sheet 1

INVENTOR.
JOHN G. FONTAINE
BY
*James N. Cyr*
ATTORNEY

Aug. 22, 1967  J. G. FONTAINE  3,336,687
CHANGEABLE EXHIBITOR

Filed July 8, 1965  5 Sheets-Sheet 2

INVENTOR.
JOHN G. FONTAINE
BY
ATTORNEY

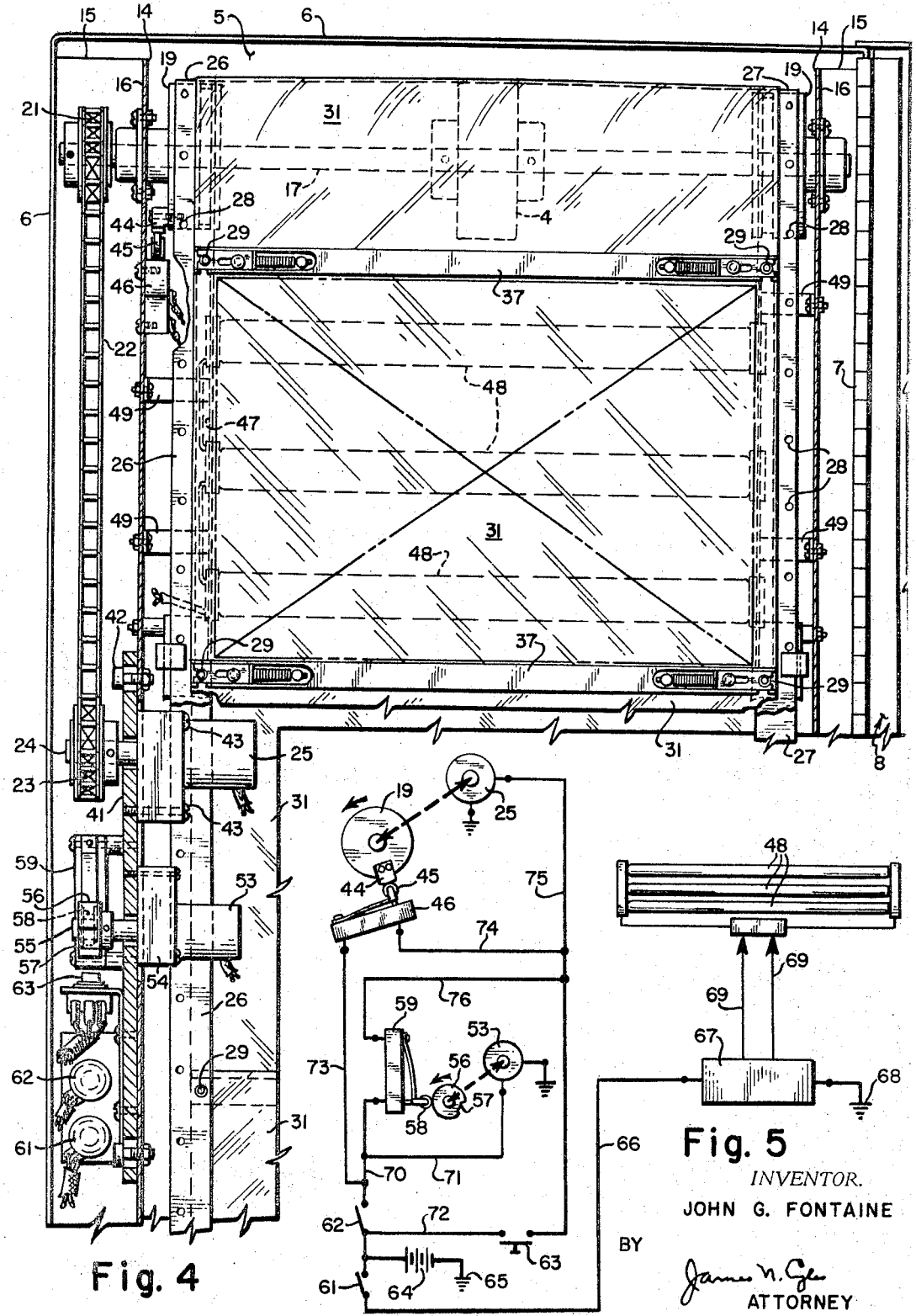

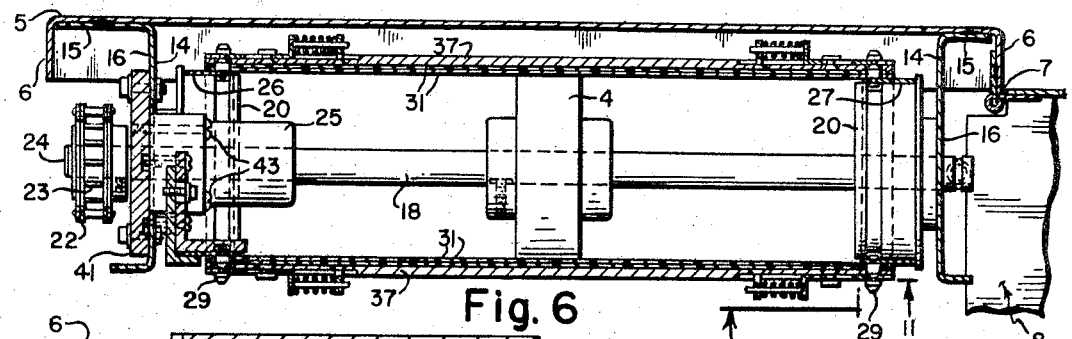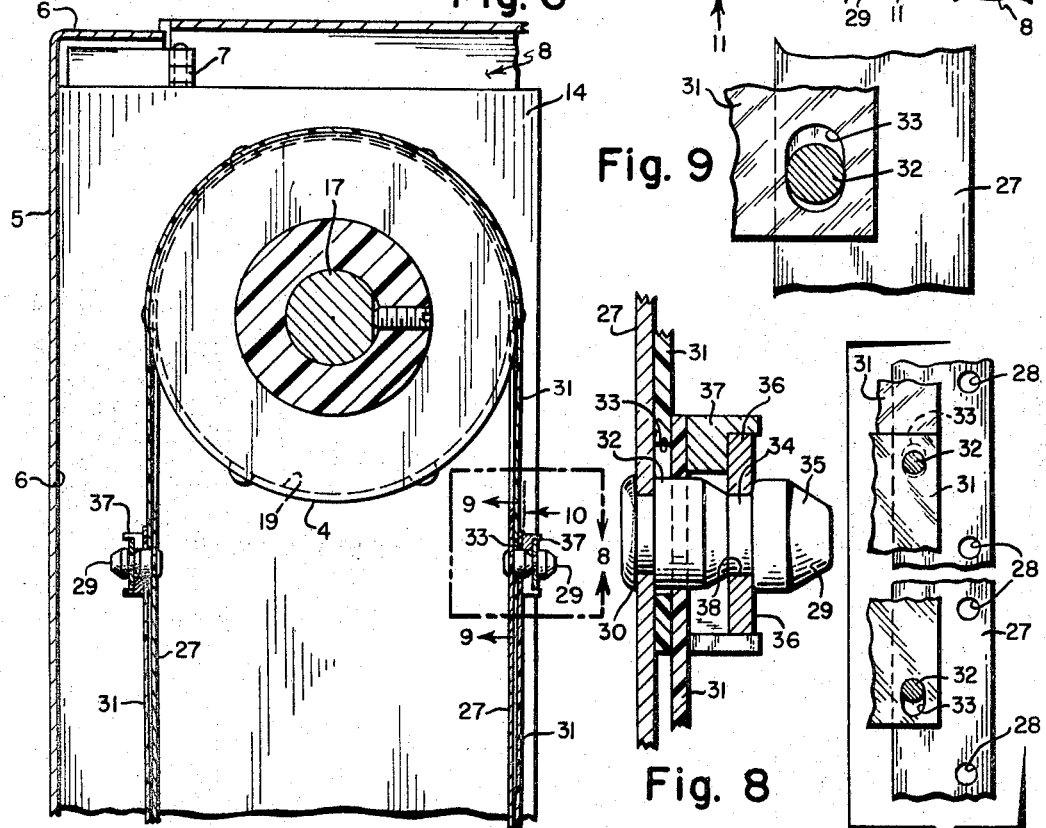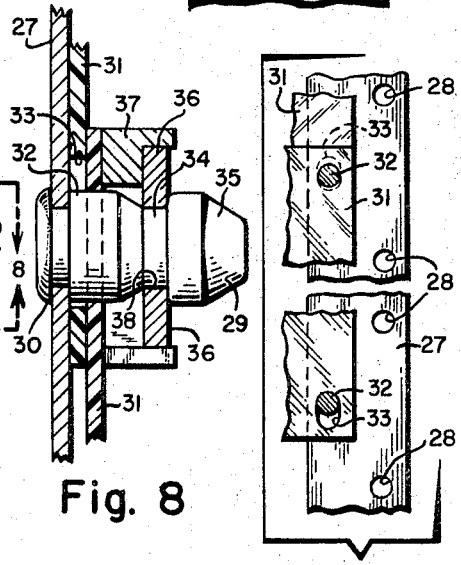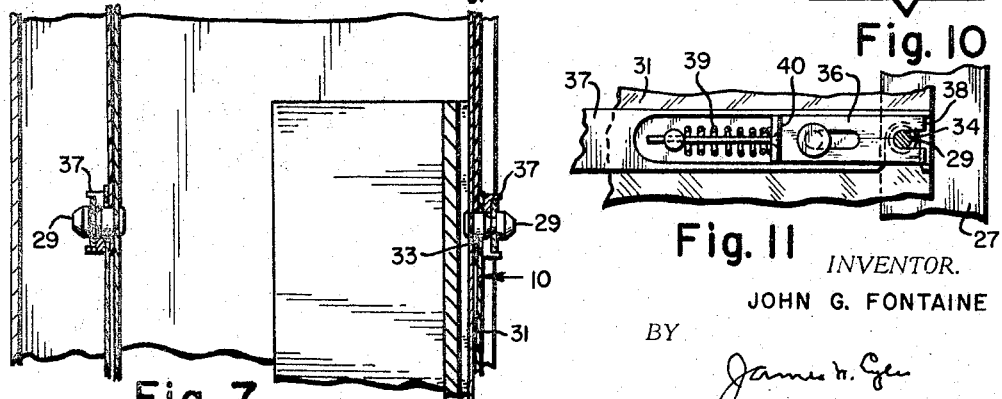
INVENTOR.
JOHN G. FONTAINE
BY
ATTORNEY

Aug. 22, 1967  J. G. FONTAINE  3,336,687
CHANGEABLE EXHIBITOR
Filed July 8, 1965  5 Sheets-Sheet 5

INVENTOR.
JOHN G. FONTAINE
BY
ATTORNEY

United States Patent Office 3,336,687
Patented Aug. 22, 1967

3,336,687
CHANGEABLE EXHIBITOR
John G. Fontaine, 2817 NE. 26th Court,
Fort Lauderdale, Fla. 33306
Filed July 8, 1965, Ser. No. 470,359
7 Claims. (Cl. 40—32)

ABSTRACT OF THE DISCLOSURE

A changeable exhibitor for display purposes having a cabinet or casing provided with a sight opening or window. A plurality of endless conveyor bands travel over sprockets rotatable in the casing on shafts therein, and the bands successively bring display panels carried by them into registration with the sight opening or window so that the panels may be seen therethrough as they become aligned with the opening. Means is provided by which each of the panels will be maintained at the sight opening or window for a predetermined length of time, and electrical illuminating means is also provided for the illumination of each panel as it is presented at the sight opening.

---

Figures 1, 12:
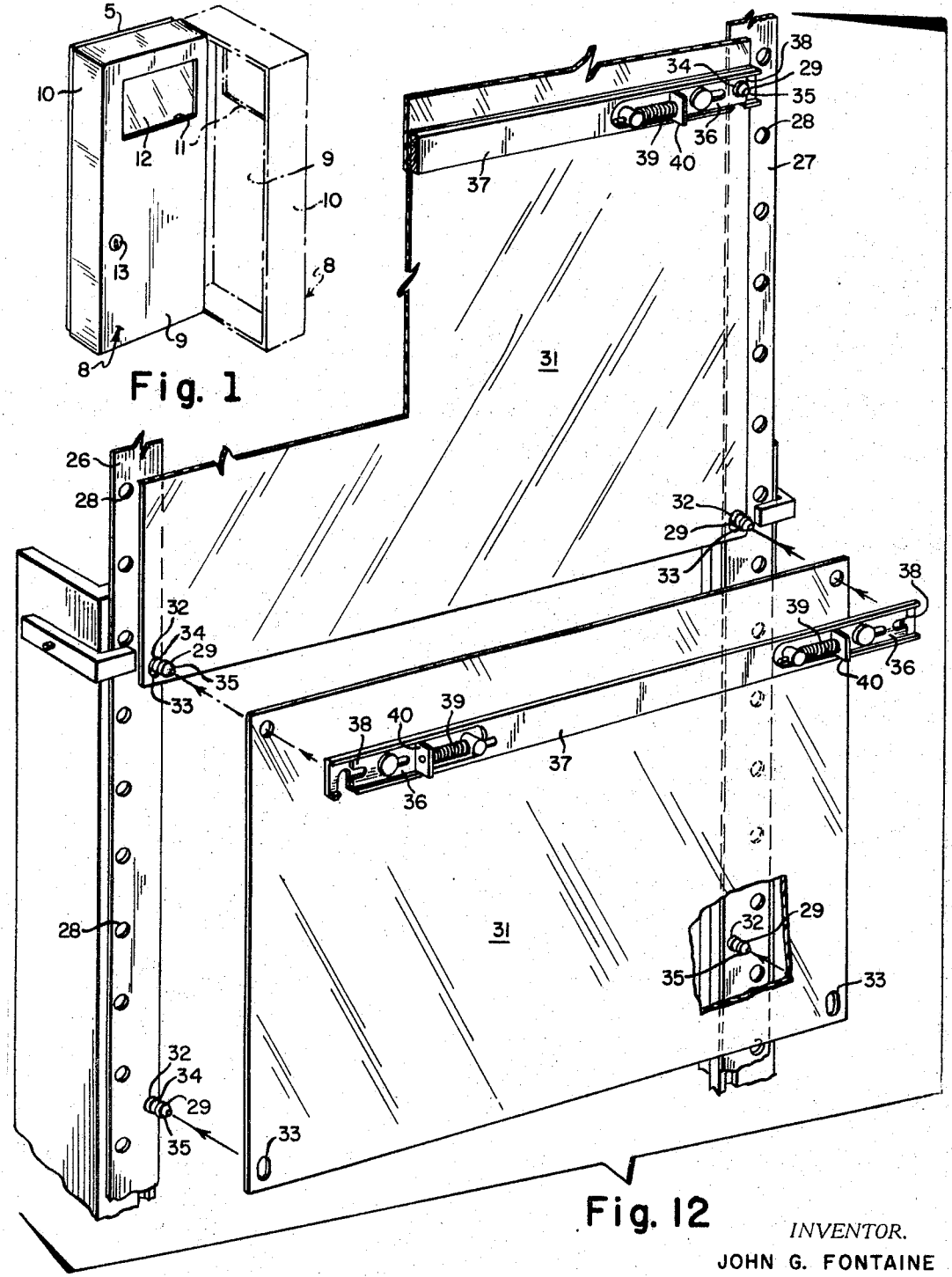

This invention relates to a changeable exhibitor and has particular reference to a changeable exhibitor having endless conveyor belts upon which is supported translucent panels of flexible nature and with the panels being in spaced apart relation to the conveyor and conducted in timed sequence to a sight opening formed in a cover of the casing in which the device is disposed.

The invention contemplates a casing adapted to be fixed upon a wall area and with the casing having a hinged cover adapted to overlie the mechanism of the device and with the cover being provided with a sight opening corresponding generally to the dimensions of the panels and with the panels being formed of translucent material and supported upon flexible conveyor bands to permit the panels to be interchanged at will and with the conveyor bands being conducted in a timed sequence to be observed through the sight opening for a predetermined length of time after which the bands are again activated to move another panel into position to be observed through the sight opening and with mechanical and electrical means for driving the bands in a step-by-step motion to display panels through the sight opening and with the electrical means embodying illuminating lamps, a drive electric motor and with means in the electrical circuit whereby, when a panel is aligned with the sight opening, the drive means will be interrupted for a predetermined time to permit visibility of the panels.

A further object of the invention is to provide an endless conveyor for supporting spaced apart panels that are alternately aligned with a sight opening in a cover and means connected with the conveyors whereby to quickly and easily connect the several panels for their movement through the machine.

A further object of the invention is to provide a pair of parallel and spaced apart metallic bands that are apertured to receive spaced taper studs constituting the means for supporting the several panels upon the conveyors and with certain of the studs being engaged by cross clamping bars that carry the panels in a vertical path and with the bands traversing pulleys at the upper and lower ends of the device that are provided with teeth that engage the apertures of the bands and with means embodied in the machine to drive an upper shaft carrying upper pulleys whereby the bands are moved simultaneously in a step-by-step manner to move one panel away from the sight opening and to shift a next adjacent panel into alignment with the sight opening.

Novel features of construction and operation of the device will be more clearly apparent during the course of the following description, reference being had to the accompanying drawings wherein has been illustrated the preferred forms of the device and wherein like characters of reference are employed to denote like parts throughout the several figures.

Figure 3:
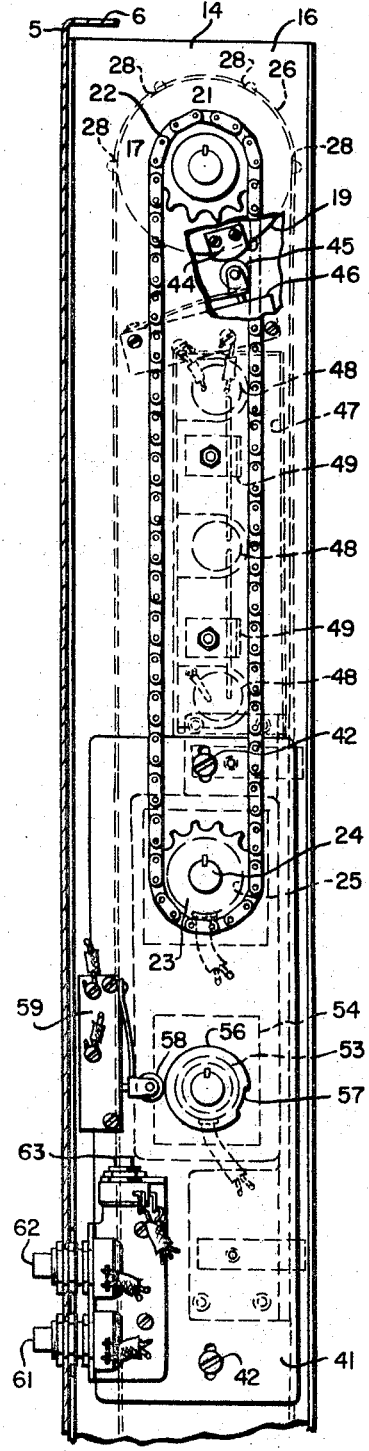
Figure 2:
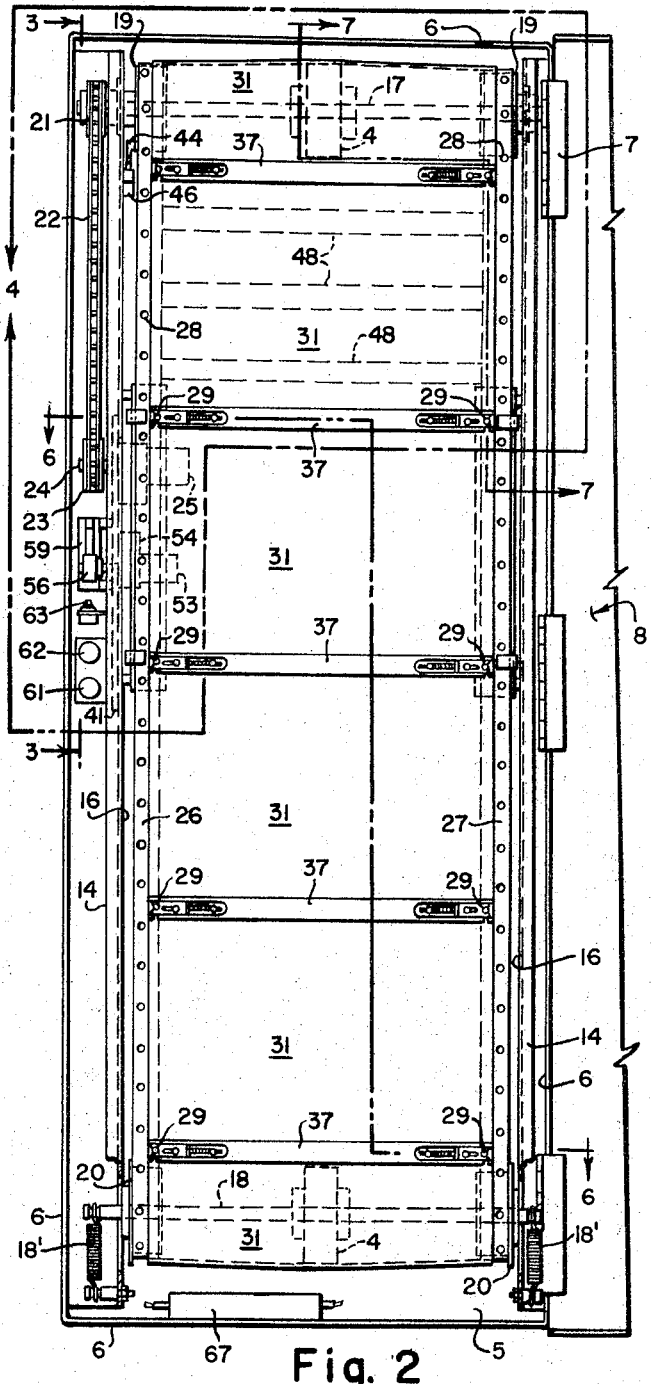
Figure 13:
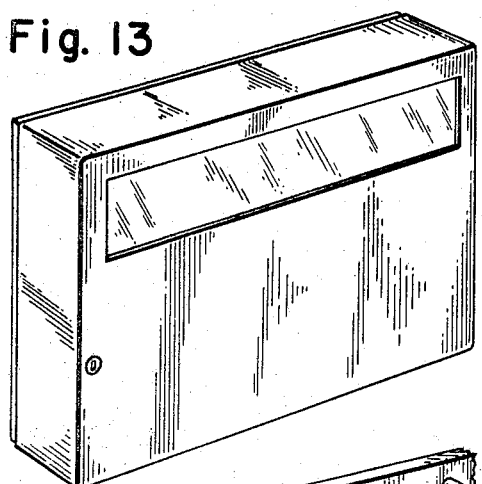
Figure 15:
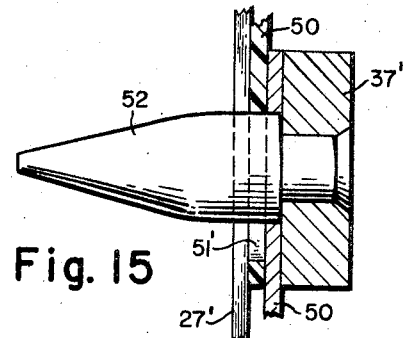
Figure 16:
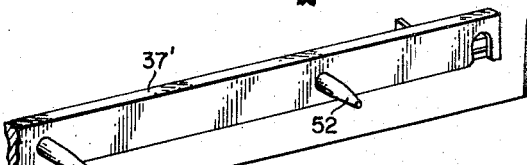
Figure 14:
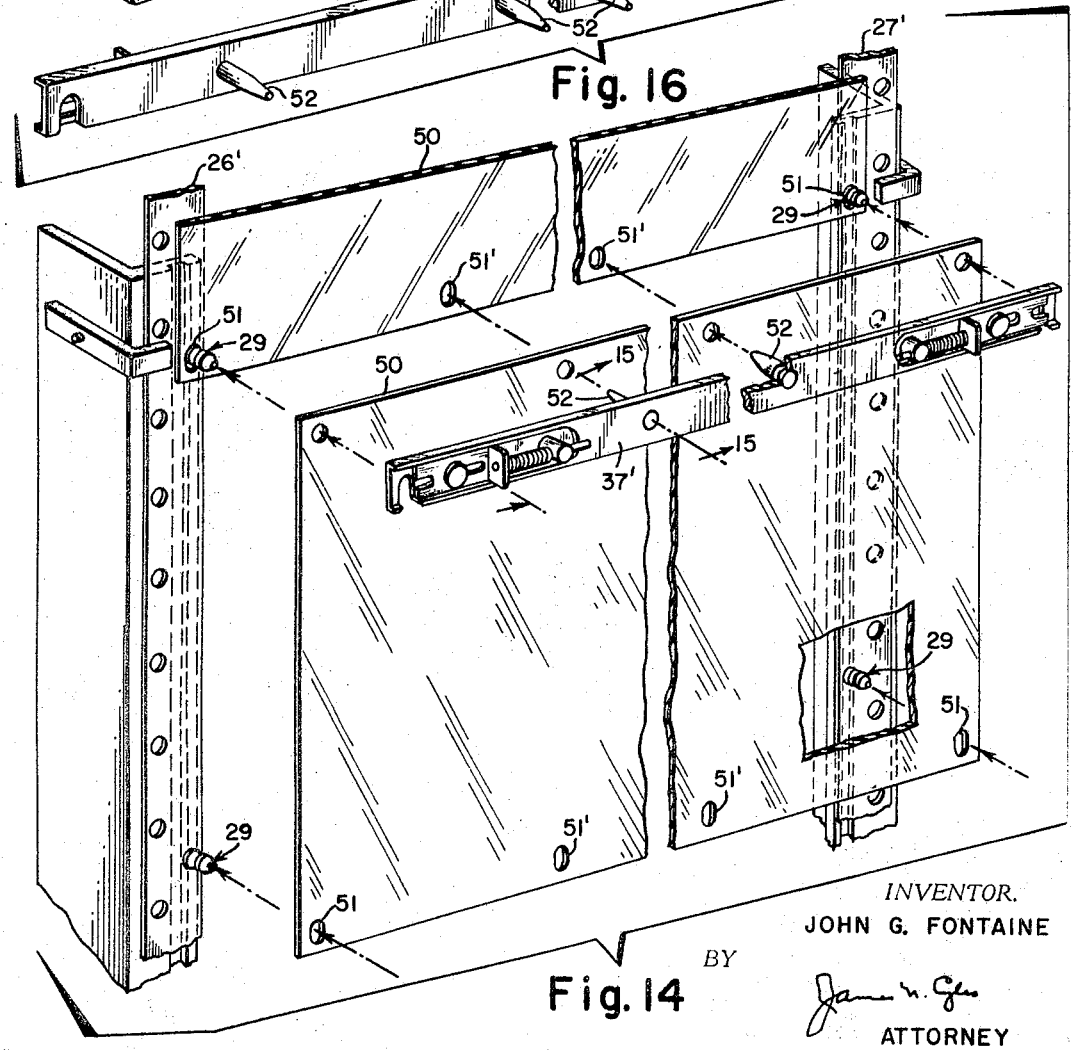

In the drawings:

FIGURE 1 is a perspective view of a casing for supporting the mechanism of this device and with a cover of the casing being shown in dotted lines in the open position, FIGURE 2 is a face view of the operating mechanism and with the cover being moved to an open position, FIGURE 3 is an enlarged section taken substantially on line 3—3 of FIGURE 2, FIGURE 4 is an enlarged view partly in section and partly in elevation illustrating that area as shown in FIGURE 2 on the line 4, FIGURE 5 is a diagrammatic illustration of the electrical circuit embodied in the device, FIGURE 6 is a section taken substantially on line 6—6 of FIGURE 2, FIGURE 7 is an enlarged vertical section taken substantially on line 7—7 of FIGURE 2, FIGURE 8 is a section of the area 8 of FIGURE 7 and illustrating supporting studs carried by conveyor bands and a cooperative clamping bar, FIGURE 9 is a section taken on line 9—9 of FIGURE 7 illustrating a lost motion stud connection for display panels, FIGURE 10 is a section taken substantially on line 10—10 of FIGURE 7, FIGURE 11 is a section taken substantially on line 11—11 of FIGURE 6, FIGURE 12 is an exploded perspective view of the conveyor bands, the supporting studs, the translucent panels and the clamping bar for supporting the panels upon the studs, FIGURE 13 is a perspective view of a casing and closure cover for a modified form of the invention and for supporting and conveying elongated translucent panels, FIGURE 14 is a view similar to FIGURE 12 and illustrating intermediate supporting means for the panels, FIGURE 15 is an enlarged transverse sectional view illustrating intermediate pins for holding the upper and lower marginal edges of the panels in alignment during the operation of the device, and taken on line 15—15 of FIG. 14, and FIGURE 16 is a rear perspective view of a clamping bar carrying the intermediate pins.

Referring specifically to the drawings and particularly to FIGURE 1, there has been provided a casing that is preferably rectangular in shape, having a fixed back wall 5 that is peripherally flanged as indicated at 6. The wall 5 and the flange 6 defines a relatively shallow supporting structure for the mechanism to be hereinafter described. Hingedly connected at 7 to one flange 6, is a cover 8. The cover 8 is adapted to be swung to and from overlying relation to the flange 6 and the back wall 5 and the cover 8 is provided with a front wall 9 and peripherally flanged as at 10, forming a relatively deep cavity for overlying the operative mechanism of this device. The wall 9 adjacent its upper end is provided with a sight opening 11 that is dimensioned in accordance with translucent panels having ornamentation thereon to be viewed through the sight opening and the sight opening may be covered by a transparent plate 12. The plate 5 is adapted to be fixed to a wall area of any particular structure where the exhibitor is to be installed and the hinged cover plate 8 is held in closed position by a latch or other lock device 13 and so that the cover plate may be swung to the open position as illustrated in FIGURE 1 to permit access to the mechanism carried by the back plate 5 and to permit the interchanging of translucent decorative panels, to be described.

Mounted to the back plate 5, as by welding or bolting, are channel frame members 14, having a connecting flange 15 and vertical walls 16. The channel members 14 at the left hand side of the device are spaced a considerable distance inwardly from the one flange 6 for the mounting of operating mechanism.

Journaled in the walls 16 are upper and lower shafts 17 and 18. The shafts 17 and 18 carry toothed rollers 19 and 20 that are fixed to the shafts 17 and 18. The shaft 17 is extended through the left journal bearing and carries a sprocket 21 that is engaged by a sprocket chain 22. The sprocket chain 22 also engages a sprocket 23, see particularly FIGURE 4 and the sprocket 23 is fixed upon a shaft 24 of a drive motor 25. Adapted to traverse the rollers 19 and 20 are flexible metallic bands 26 and 27. The bands 26 and 27 are perforated at spaced apart points as indicated at 28 and with the perforations being spaced apart in accordance with the teeth upon the rollers 19 and 20, similar to a gear for driving the bands through the medium of the drive motor 25. The bands 26 and 27 are tensioned by means of coil springs shown at 18' in FIG. 2. Also, the bands are provided with spaced apart studs 29, see particularly FIGURE 8 and these studs are riveted to the bands 26 and 27, as indicated at 30. The studs 29 project forwardly from the bands 26 and 27 and constitute mounting means and clamping means for translucent panels 31. The panels are also perforated to engage over a shoulder 32 of the studs and the panels at their lower portions are apertured at 33 to engage over the shoulder 32 and the lower apertures 33 are elongated in shape to provide a lost motion connection between the panels 31, as the panels pass over the rollers 19 and 20. The studs 29 are provided with a beveled groove 34 that extends to the shoulder 32 and to facilitate a sliding movement of the panels over the stud so that the marginal edges of the panels will be engaged with the shoulder 32 also as shown in FIGURE 8. The studs are also provided with a tapered head portion 35, constituting guide means for the edges of the panels and to also constitute a locking means for slides 36, carried by a clamping bar 37 that extends from side to side and with the slide having a notch at its end, shown at 38 for engaging the groove 34 and to lock the bar 37 against the overlapping edges of the panels. The slide 36 is biased to a locking position by spring 39 and a thumb piece 40 provides means for shifting the slide 36 against the tension of the spring 39 in the mounting of the device upon the bands. It will be apparent, that the panels 31 are engaged over the studs 29 of movement over the beveled surfaces of the head and the beveled edge of the groove 34 to fully seat against the bands 26 and 27 after which, the bars 37 are engaged against the overlapping edges of the panels and with the slide engaging the groove 34 to lock the panels in position during their movement over the rollers 19 and 20. Intermediate the shafts 17 and 18, there is provided a tension roller 4, to impart tension upon the intermediate portion of the panels as they are conducted over the rollers 19 and 20 and due to this expansion of the panels with respect to the shafts 17 and 18, the elongated apertures 33 permit a slight movement of the panels with respect to the bands 26 and 27.

With respect to this form of the invention presently described, an upper panel 31 is engaged over the studs 29 of each band 26 and 27 and then the next lower adjacent panel 31 is engaged thereover and with the panels having their marginal portions overlapping as clearly shown in FIGURE 8. With the panels engaged with the studs, the clamping bars 37 are disposed over the studs and locked into position by the slides 36, securely holding the panels against movement outwardly as the bands convery the panels in a step-by-step relation upwardly for the upper shaft 17 and the lower shaft 18 and with the upper panels 31 adapted to be interrupted in its movement by mechanism, to be described and with an upper panel 31 being momentarily stopped to align the panel with the sight opening 11 of the cover 10. It is contemplated that the panels be driven by the motor 25 and interrupted for a predetermined length of time to permit the panel to be viewed after which, the bands 26 and 27 are again activated to move a next adjacent panel to the sight opening 11 and this action continues in a step-by-step relation whereby a multiplicity of panels are aligned with the sight opening 11. In substituting panels of different configuration, the closure cover 8 is opened and the bars 37 are removed from the studs 29 and the panels likewise removed from the studs and other panels substituted therefor.

Fixed to a left hand bracket plate 16, is a relatively thick elongated plate 41, bolted to the plate 16 by bolts 42. The motor 25 is also supported upon the plate 41 by bolts 43. One upper roller 19 is provided with a fixed block 44 that engages a stop roller 45 of an interruptive switch 46.

Disposed within the housing 5 and mounted between the walls 16 of the channel frame members 14 is a light housing 47 carrying fluorescent light bulbs 48, shown more clearly in FIGURE 5 and the housing 47 is generally rectangular in shape and is disposed behind the opening 11 of the cover 8. The housing 47 is supported upon the walls 16 by brackets 49 and whereby to illuminate a complete area of the panel as the panel is moved upwardly to overlie the sight opening 11. The means for energizing the lamps 48 will be hereinafter described.

In FIGURES 13–16 inclusive, there has been illustrated a slightly modified form of the invention wherein relatively narrow elongated panels 50 are employed and the panels 50 are provided with additional elongated openings 51 in the lower marginal edge of the panels to engage the studs 29. The openings 51 correspond to the openings 33 previously described and to engage over the studs 29 upon the bands 26 and 27. It becomes necessary to further provide studs in the form of tapered pins to pass through the openings of the panels and these pins, illustrated at 52 extend through apertures 51' and with the pins being carried by the rear wall of the clamping bars 37'. The pins 52 pass through the openings in the marginal edges of the panels and support the panels against warping or flexing during their movement through the machine.

Fixed to the plate 41, shown particularly in FIGURE 4, is a timer motor 53 having a reduction gear box 54 and a shaft 55 extending through an opening in the plate 41 and carrying a cam 56, that is notched at one side, as at 57 for engagement with a roller 58 of a switch 59. The motor 53 is continuously actuated and the switch 59 functions to energize a drive motor 25 upon the upper shaft 17. Disposed between the circuit, as illustrated in FIGURE 5 is a light switch 61, a power switch 62 and a service switch 63. A source of electrical energy, such as twelve volt battery has been indicated at 64 and the battery is grounded as at 65. Connected to one side of the light switch 61, is a conductor 66, conducting twelve volt current to inverter 67. The inverter is grounded as at 68. The inverter 67 functions to convert twelve volt current to 110 volt A.C. through conductors 69 whereby to energize the lamps 48, a conductor 70 leads from one side of the switch 62 to one side of the switch 59 and a conductor 71 leads from the positive conductor 70 to the motor 53 and then, to the ground. A conductor 72 leads from the battery 64 to the service switch 63 and then to the drive motor 25. Also leading from the conductor 70 is a conductor 73, leading to the switch 46 and from the opposite side of the switch 46, a conductor 74 leads to a common conductor 75 and a bypass conductor 76 leads to one side of the switch 59 and with the conductor 70 leading to the opposite side of the switch 59.

In the operation of the device, the operator first energizes the light switch 61, causing current to flow from the battery, through the conductor 66 and the inverter 67, causing the lamps 48 to glow. The power switch 62 is then actuated, permitting current to flow from the battery 64 to the motor 53, the switches 46 and 59 and when the motor 25 is actuated, rotating the disk 19, the panels will be shifted with the bands 26 and 27 until the block 44 overrides the roller 45, interrupting the flow of current to the motor 25 momentarily and with the motor 53 being continuously operated, the cam 56 overrides the roller 58 until the roller drops into the notch 57, again energizing the motor 25 sufficiently to cause the block 44 to move away from the roller 45 and, when the cam 56 moves away from the roller 58, current is then directed to the motor 25 for again driving the bands 26 and 27, to move another panel into position to be viewed through the sight opening 11 and usually, one revolution of the disk 19 is capable of moving one panel at a time into position and with a new panel in position, the block 44 has opened the switch 46, preventing current from flowing to the drive motor 25 until such time as the disk 56 has moved its notch 57 to the roller 58, permitting the switch 59 to close and then permit current to flow to the conductors 75 and 76 back to the motor 25 for another movement of the bands 26 and 27 to shift another panel into position.

It will be apparent from the foregoing that a novel interchangeable exhibitor has been provided. The several panels are engaged with the studs 29, one on top of the other, as illustrated in FIGURE 8 and the clamping bars 37 engaged therewith and their slides interlocked with the studs to maintain the panels in driving position with respect to the bands 26 and 27 throughout the movement of the device and as each panel is moved into position in alignment with the sight opening, current is interrupted momentarily to permit the subject matter upon the panels to be viewed and then again set in motion to drive a next adjacent panel into position. The speed at which the panels traverse the machine is determined by the reduction gearing for the motor 53. The parts are relatively simple, strong, durable and most effective for an interchangeable exhibitor as set forth.

It is to be understood that the invention is not limited to the precise construction shown, but that changes are contemplated as readily fall within the spirit of the invention as shall be determined by the scope of the subjoined claims.

I claim:

1. A changeable exhibitor of the character described comprising an elongated base plate, a cover that is hinged to the base plate to completely overlie the base plate and with the cover having a sight opening formed therein, a pair of spaced apart mounting plates fixed to the base in spaced apart parallel relation, an upper shaft journaled in the plates and with the shaft inwardly of the plates being provided with sprockets, a lower shaft journaled in the plates adjacent the lower ends thereof and with the lower shaft being provided with sprockets, endless metallic bands that override the sprockets of the upper and lower shafts and with the bands being provided with spaced apart apertures to engage the sprockets of the upper shaft, means for driving the upper shaft intermittently, studs projecting from the bands that are adapted to engage the marginal edges of translucent panels and whereby the panels are shiftable in an upward direction by the drive means to dispose the several panels into alignment with the sight opening of the cover, illuminating means carried by the plates and behind the translucent panels, a tension roller disposed intermediate the lengths of the upper and lower shafts to exert tension upon the panels as they pass about the upper and lower shafts, the said lower shaft projecting through the plates and spring means connected to the projecting ends of the lower shaft whereby to maintain tension upon the bands, each of the panels having their upper and lower edges in overlapping relation with the next adjacent panels and held upon the studs and a clamping bar engaging the studs and overlying the overlap edges of the panels.

2. A changeable exhibitor of the character described comprising a base plate of rectangular form for mounting engagement upon a fixed surface, a cover hingedly connected to one side of the base plate and movable to overlie the base plate, the cover being provided with a sight opening adjacent its upper end, mounting plates fixed to the base plate and projecting forwardly, an upper shaft having its ends journaled in the plates and with the shaft inwardly of the plates being provided with spocket rollers, a lower shaft extending through openings in the plates and provided with flanged rollers and with the extended ends of the last named shaft being connected to springs, a pair of perforated metallic bands adapted to override the rollers of the upper and lower shafts, the upper shaft extending outwardly from the adjacent plate and carrying a sprocket, a drive motor mounted upon the inner side of one plate and with the motor driving through a reduction gearing to a sprocket and a chain for engaging the last named sprocket and the sprocket of the upper shaft whereby to drive the bands, the bands being endless and provided with spaced apart tapered studs that engage openings formed in translucent panels, the several panels having their marginal edges in overlapping relation and jointly engaging the studs, a clamping bar overlying the overlapped edges of the panels and with the ends of the bars having spring biased means to engage the studs whereby to hold the panels in position upon the studs during their traverse over the rollers, illuminating means mounted between the plates and fixed thereto, a continuously driven motor, a cam driven by the last driven motor for actuating a switch device, the upper shaft having one sprocket provided with a lug that actuates a switch device at each revolution of the shaft and interrupting the rotation of the shaft when a panel to be exposed is in alignment with the sight opening and with the cam from the second named motor operating its switch to cause the lug to move away from the adjacent switch to again permit the first named motor to shift an adjacent panel into alignment with the sight opening, a complete revolution of the upper shaft causing the bands to be driven and to move another panel into position and switch means for energizing the illuminating means and switch means for driving the second named motor, each of the shafts intermediate their length being provided with rollers over which the panels travel and with the rollers being of slightly greater diameter than the sprockets whereby to maintain a tension upon the panels as they pass over the rollers.

3. The structure according to claim 2 wherein the base plate has a marginal forwardly projecting flange and with the cover having a marginal flange that engages over the flange of the base plate, the said studs being fixed to the bands at spaced apart points in accordance with the vertical width of the panels, the said clamping bars extending from one band to the other and adapted to overlie the marginal overlapped edges of the panels, the clamping bars at the opposite ends being provided with a slide having a notched end portion that has fitment over the studs and with the slide being biased in a locking direction by a spring.

4. The structure according to claim 2 wherein the studs are fixed to the bands and with the studs having a cylindrical shoulder to receive the marginal edges of the panels, a groove intermediate the length of the stud and with the groove connected to the shoulder by a bevel to facilitate the engagement of the edges of the panels upon the shoulder, the stud at its outer end terminating in a beveled face whereby the panels are forced over the beveled face and past the groove to engage upon the shoulder, the clamping bar having slides that are notched at their ends to engage the groove of the stud whereby to lock the bars against the marginal edges of the panels, each of the slides having finger engaging lips whereby the slides may be shiftable inwardly against the tension of the springs to release the clamping bars from the studs and to permit replacement of the panels.

5. A changeable exhibitor of the character described that comprises a mounting plate that is flanged to form a relatively shallow housing, a pair of outwardly extending parallel mounting plates fixed within the housing, the plates being spaced apart, an upper shaft that has its ends journaled in the plates and with the shaft having fixed thereto a pair of sprocket forming rollers, a lower shaft that extends through slots formed in the plates and with springs connected to the ends of the shaft and to the plates, the second named shaft having flanged rollers fixed thereto inwardly of the plates, the upper shaft being extended at one end and provided with a sprocket, a drive motor fixed to one plate and driving a shaft having a sprocket fixed thereto and a sprocket chain extending between the sprockets for driving the upper shaft, a pair of flat metallic bands that are perforated to engage the sprocket rollers of the upper shaft and to override the flanged rollers of the lower shaft, the said springs exerting tension upon the bands, each of the bands at spaced apart points being provided with fixed studs that project outwardly from the face of the bands and constituting mounting means for translucent panels and with the panels being perforated to engage over the studs and with the marginal edges of the panels being in overlapping relation whereby adjacent panels are jointly engaged upon the studs, a clamping bar extending across the overlapped ends of the panels and having latch means that engage the studs outwardly of the panels and whereby to retain the panels against displacement from the studs, the panels being driven by a drive motor, means carried by the upper shaft for interrupting the drive motor so that one revolution of the upper shaft is capable of moving a panel upwardly a distance for disposing a panel in a viewing position, a continuously driven motor fixed to the mounting plate and with the motor having a shaft that is provided with a cam and a cam groove, the said cam actuating a switch whereby to again actuate the drive motor for moving another panel into viewing position, a lamp housing fixed to the plates and carrying a plurality of fluorescent lamps, a switch for energizing the lamps from a source of electrical energy, a switch for actuating the continuously driven motor and a roller fixed upon the upper and lower shafts and with the roller having a greater diameter than the diameter of the sprocket rollers whereby to exert a tension upon the panels as they pass over the upper and lower shafts and a cover hingedly connected to the base housing and swingable to overlying relation with respect to the base housing and with a front wall of the cover being provided with a sight opening disposed at a point with respect to a position where a panel is stopped for intermittent viewing.

6. The structure according to claim 2 wherein the lug carried by the sprocket of the upper shaft is fixed to the face of the sprocket and projects radially beyond the margin of the sprocket, the said lug adapted to engage a roller device that actuates a cut-off switch for the drive motor and whereby to interrupt the rotation of the shaft momentarily, the cam driven by the second named motor having a notch that receives a roller carried by another switch and with the roller when engaging the notch adapted to close the switch for again actuating the drive motor for the upper shaft and to move the lug from the roller of the first named switch to permit the drive motor to move the lug from the roller and to energize the drive motor for shifting another panel into position whereby the drive motor is de-energized when the lug actuates its adjacent switch, each of the motors driving through a reduction gearing to control the motion of the upper shaft and the bands.

7. The structure according to claim 2 wherein the marginal edges of the panels are perforated along their overlapping edges and with the clamping bar having inwardly extending spaced apart pins that pass through the apertures whereby to prevent buckling of the panels when the device is adapted to display relatively long panels and with the pins being fixed to the bar and tapered in their length to facilitate the entry of the pins through the joint apertures of the panels.

References Cited
UNITED STATES PATENTS

| | | | |
|---|---|---|---|
| 1,012,989 | 12/1911 | Crane | 40—32 |
| 2,171,462 | 8/1939 | Trollope et al. | 40—32 |
| 2,200,533 | 5/1940 | Borregard | 40—32 |
| 2,585,687 | 2/1952 | Sanderson | 40—32 |
| 2,947,100 | 8/1960 | Loskill et al. | 40—32 |
| 3,187,451 | 6/1965 | Fontaine | 40—32 |

EUGENE R. CAPOZIO, *Primary Examiner.*

W. GRIEB, *Assistant Examiner.*